March 24, 1959  E. A. E. HAGLUND  2,879,087
CONNECTING DEVICE

Filed Feb. 7, 1958  3 Sheets-Sheet 1

INVENTOR.
Erik Axel Einar Haglund
BY
Cushman, Darby & Cushman
Attorneys

March 24, 1959  E. A. E. HAGLUND  2,879,087
CONNECTING DEVICE
Filed Feb. 7, 1958  3 Sheets-Sheet 2
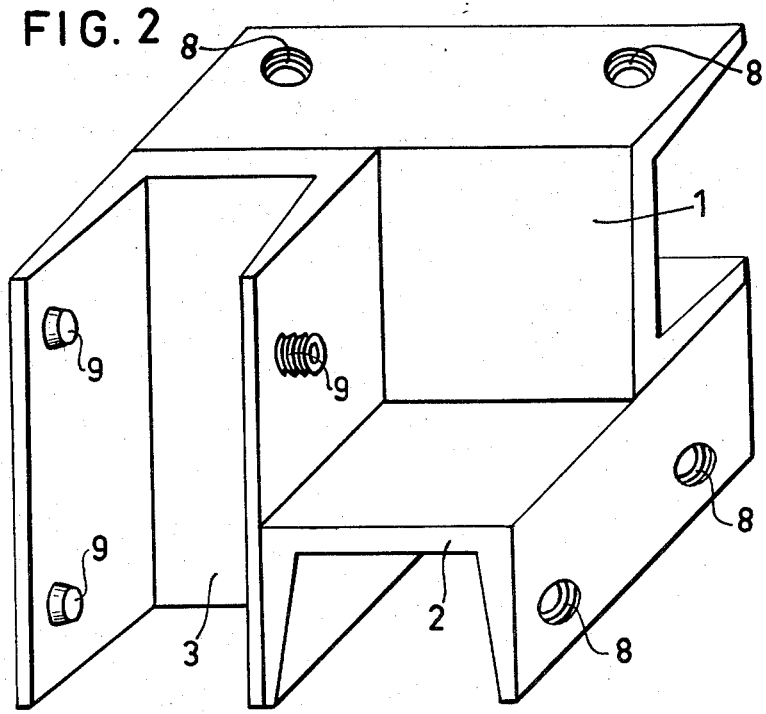
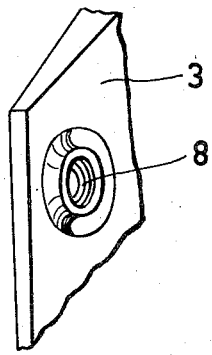
INVENTOR.
Erik Axel Einar Haglund
BY
Cushman, Darby & Cushman
Attorneys March 24, 1959  E. A. E. HAGLUND  2,879,087
CONNECTING DEVICE
Filed Feb. 7, 1958  3 Sheets-Sheet 3
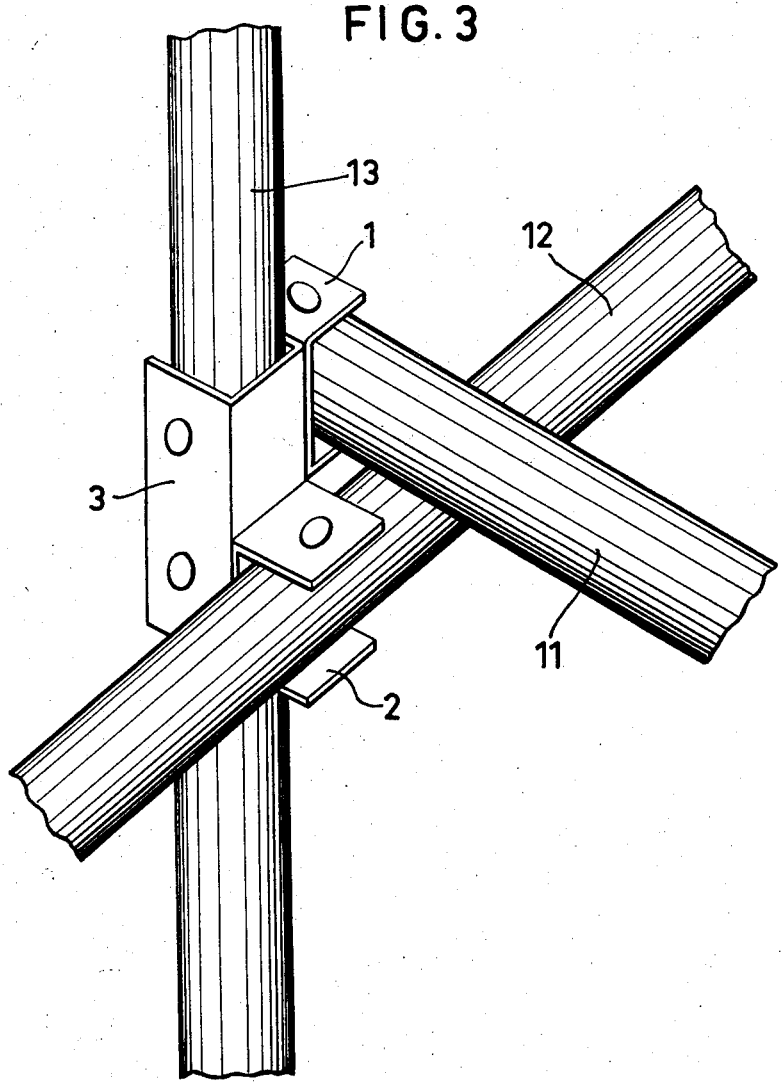

United States Patent Office 2,879,087
Patented Mar. 24, 1959

2,879,087

CONNECTING DEVICE

Erik Axel Einar Haglund, Johanneshov, Sweden, assignor to Aktiebolaget Torsten Lagerman, Stockholm, Sweden, a Swedish joint-stock company Application February 7, 1958, Serial No. 713,880

Claims priority, application Sweden February 27, 1957

7 Claims. (Cl. 287—54)

The present invention relates to a device for connecting at least two tubular members or beams with each other. Such devices hitherto known have suffered from at least one of the following drawbacks. Thus, they have been either composed of tubular sleeves, in which tubes or bars can be inserted only end-wise, or constructed for connecting tubes or bars crossing each other, by means of pivotable clamps or the like which are in the way or constitute obstacles when utilizing stands constructed of said tubes or bars by means of such connecting devices.

The device according to the present invention, the main object of which is to remove the above drawbacks and provide a simple connecting device which may be easily handled, comprises a plurality of interconnected channel bars adapted to receive the tubes or bars and having one open side through which said tubes or bars are insertable in respective channel bar. The device is mainly characterized in that the channels confining side walls of the channel bars are provided with openings for threaded screws, bolts or the like, which may be screwed into the openings to bear upon tubes or bars inserted in the channel bars and in that said openings are located so far from the bottoms of the respective channels and have such directions that the screws and the like will contact the tubes or beams in points more distant from the bottom of the respective channel, which normally means that the distance from the openings to the bottom of the channel shall be greater than half the width of the open side of the channel.

In the accompanying drawings some embodiments of the invention are illustrated as examples, each connecting device comprising three channel bars.

Fig. 2 is a perspective view illustrating a modified embodiment.

Fig. 3 is also a perspective view showing another embodiment.

Fig. 4 is a perspective view showing a modified detail.

Figure 1:
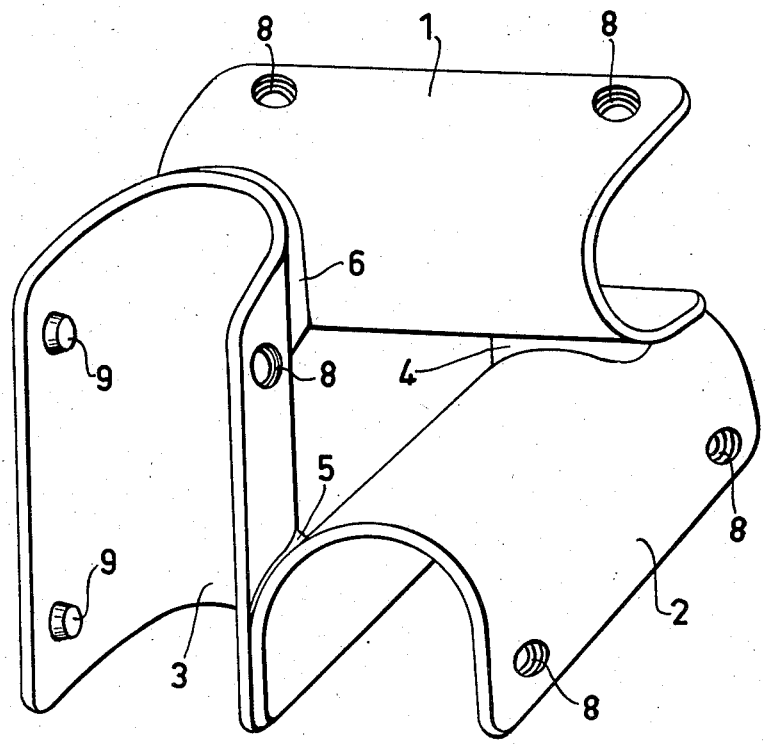
Fig. 1 is a perspective view showing a connecting device according to the invention.

The connecting device according to Fig. 1 comprises three channel bars 1, 2, 3 having substantially U-shaped cross section, each channel bar being open at its ends and at one side. Each channel bar is secured to the two others in two points 4, 5, 6 on its outer surface.

The channel bars 1, 2, 3 are preferably perpendicular to each other and twice as long as they are deep. Each channel bar is provided with an appropriate number of threaded holes or openings 8, preferably three in number, in which locking or clamping screws or bolts 9 are screwed in, by means of which tubes beams or the like (not shown), which suitably have been introduced perpendicularly to the longitudinal axis of the channel bars, can be secured in relation to the connecting device and to one or more tubes or beams inserted therein. In order to obtain this it is necessary that the screw-holes are located so far from the bottom of the channels and have such directions that the screws will contact the tubes or beams in points more distant from the bottoms of the respective channels than are the longitudinal axes of the tubes, so that the resultant of the pressures exerted upon each tube by the screws or bolts will be directed substantially towards the bottom of the channel. This normally means that the distance of the screw-holes shall be greater than half the width of the open side of the channel bar.

The connecting device according to Fig. 1 may be cast in one piece or composed of three channel bars united with each other by welding.

In the modified embodiment shown in Fig. 2, in which the same reference characters as in Fig. 1 have been used to designate like parts, the channel bars with U-shaped cross section have been replaced by short pieces of U-irons welded to each other in such a manner that an essential portion of the web and one flange of each U-iron abuts against a corresponding flange or web portion of the two others. Alternatively, the whole connecting device of Fig. 2 may be cast in one piece.

The modification according to Fig. 3 which also as an example illustrates how the connecting device according to the invention unites three tubes or the like 11, 12, 13 with each other, differs from the embodiment according to Fig. 2 only therein that channel bars 1 and 2 are only half as long as before, that is half as long as channel bar 3, the channel bar 2 having been turned 90° so that its web or bottom rests against the web or bottom of channel bar 3.

Fig. 4 shows a modified embodiment of the upper left corner of the U-iron 3 in Fig. 2 and illustrates how the material can be reinforced around the holes 8, so that the threads become longer and stand greater stresses. Of course, such reinforcement may be used also in the embodiments according to Figs. 1 and 3.

The axes of the holes 8 are directed towards the longitudinal axes of the tubes, beams or the like when inserted into the connecting device. In other words, these holes are located at such a distance above the bottom of the channel members or bars and extend in such directions that the screws or fastening means 9 contact the tubes at points located at a greater distance from the bottom of the channel bars or members than the axial center lines of the tubes so that normally the distance of the screw holes from the bottom of each channel bar or member is greater than half the width of the open sides thereof.

The embodiments described and shown in the drawings are to be regarded only as examples and may as to their details be modified in various ways within the scope of the following claims. For instance the connecting devices illustrated comprising three channel bars may instead comprise another number of channel bars and possibly be supplemented with additional channel bars arranged besides channel bars 1—3 possibly being inclined thereto.

What I claim is:

1. A clamping device for connecting tubes and the like with each other, said device including three substantially channel-shape members, each of said members having one open side for receiving a tube, the bottom of the first member being secured to the bottom of the second member and the bottom of the third member being secured to one of the side walls of the first member, each of said members having threaded holes in the side walls thereof, retaining means extending into said holes and engageable with a tube when the latter is inserted into the channel member so as to maintain the tube in a fixed position, the second and third channel members being located opposite different transverse planes in relation to the longitudinal axis of the first channel member, and said holes being located at such a distance above the bottom of the channel members and extending into such directions that the retaining means contacts the tubes at points located at a greater distance from the bottom of the channel members than the axial center lines of the tubes so that normally the distance of the screw holes from the bottom of each channel member is greater than half the width of the open side thereof.

2. A device according to claim 1, characterized in that the three channel members are mutually alike.

3. A device according to claim 1, characterized in that the length of the first members approximately equals the sum of the widths of the second and third channel members, measured between the side walls of the respective channel members, the two shorter members being preferably mutually alike.

4. A device according to claim 1, characterized in that the three channel members consist of short U-irons which are welded together.

5. A device according to claim 1, characterized in that it is cast in one piece.

6. A device according to claim 2, characterized in that the bottom of the second channel member is also united with or secured to one of the side walls of the third channel member.

7. A device according to claim 2, characterized in that there are three screw holes and three screws for each channel member, and that one of said screw holes is located in another side wall of the channel member than are the others.

References Cited in the file of this patent

UNITED STATES PATENTS

| | | |
|---|---|---|
| 1,963,981 | Garrett | June 26, 1934 |
| 2,044,700 | Jones | June 16, 1936 |
| 2,088,890 | Winby et al. | Aug. 3, 1937 |
| 2,101,317 | Lemieux | Dec. 7, 1937 |
| 2,571,337 | Burnham | Oct. 16, 1951 |
| 2,651,532 | Hobbs | Sept. 8, 1953 |